United States Patent Office 3,600,398
Patented Aug. 17, 1971

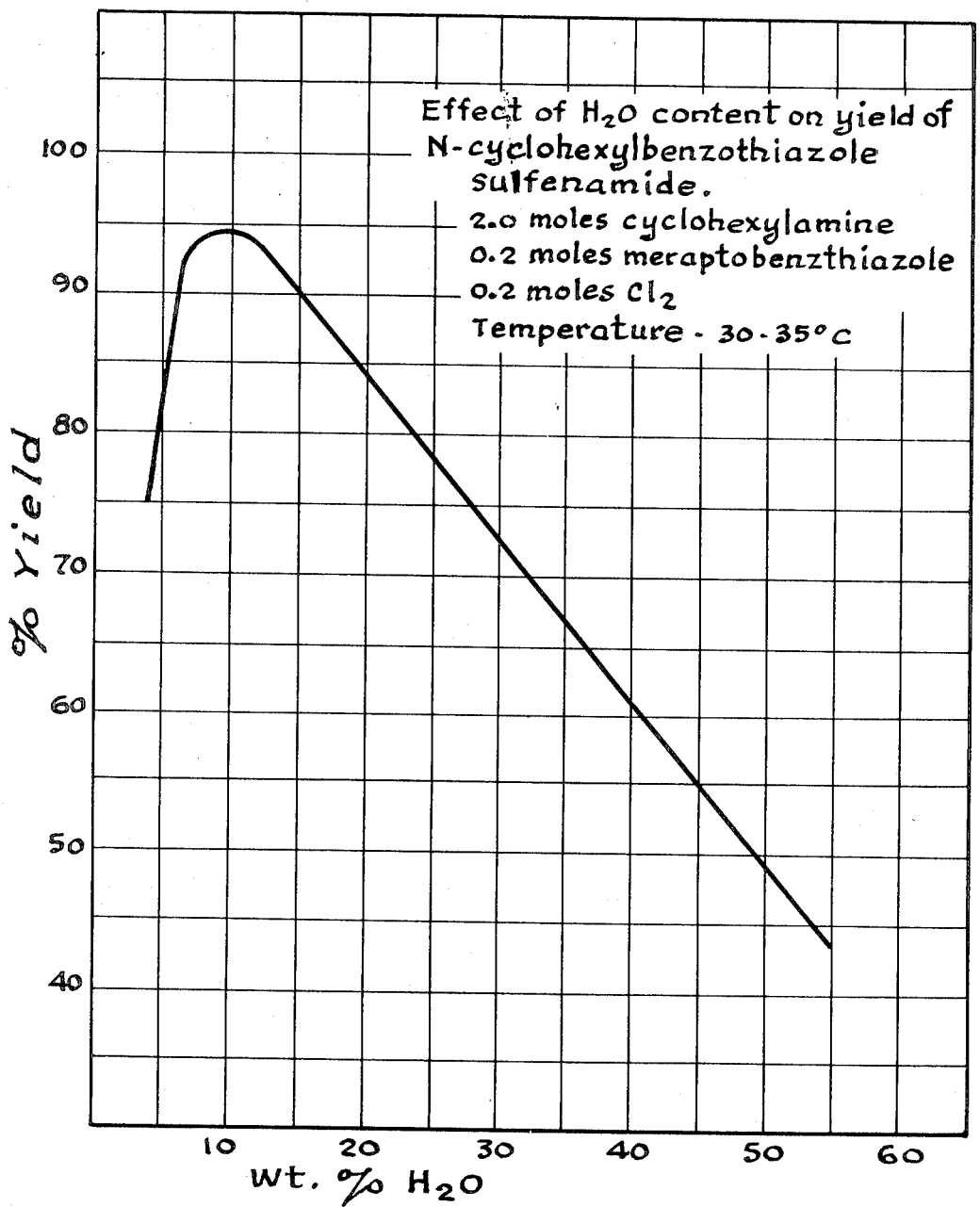

3,600,398
AMINE DERIVATIVES OF MERCAPTOBENZO-THIAZOLE
Jerry J. Svarz, La Grange, Louis A. Goretta, Naperville, and Wood E. Hunter, Lombard, Ill., assignors to Nalco Chemical Company, Chicago, Ill.
Filed Apr. 18, 1969, Ser. No. 817,337
Int. Cl. C07d 91/44
U.S. Cl. 260—306.6A          1 Claim

ABSTRACT OF THE DISCLOSURE

A process for producing the thiazole sulfenamides from the group consisting of morpholinobenzothiazole sulfenamide, cyclohexylbenzothiazole sulfenamide and N-tertbutylbenzothiazole sulfenamide.

These sulfenamide derivatives are produced in 94%+ yield and at extremely high purity through a common generalized procedure involving the oxidation of mercaptobenzothiazole in the presence of excess amine and at least 8% by weight of water based on the total reaction mixture with either chlorine, bromine, iodine or an alkali metal hypochlorite.

INTRODUCTION

Sulfenamides have become of extreme commercial importance as lubricating oil additives, fungicides and rubber accelerators. Their most important commercial utilization is their use as accelerators in rubber vulcanization. In order to have efficient application in such a process the sulfenamide accelerators must be of as high a purity as is commercially feasible.

The morpholinobenzothiazole, N-tertbutylbenzothiazole, and N-cyclohexylbenzothiazole sulfenamides are currently the best known rubber accelerators and are widely used for such a purpose.

It has long been known that these sulfenamides may be prepared through some process involving the oxidation of mercaptobenzothiazole in the presence of amines. In addition to this basic oxidation, each process teaches its particular refinements.

A striking observation of the prior art methods for making these derivatives is that no common process exists. The prior art is saturated with allegedly successful processes. However, they all have the same fault. None of these processes teaches a common, generalized method to make the three sulfenamides referred to in this invention.

Generally the processes which do exist for producing the individual sulfenamides referred to above also have the additional fault of producing poor yields and/or impurities. In either case, subsequent purification is necessary.

It would be of great advantage to the art if all three of the sulfenamides referred to, i.e., morpholinobenzothiazole sulfenamide, N-tertbutylenzothiazole sulfenamide and N-cyclohexylbenzothiazole sulfenamide, or any other sulfenamide were able to be prepared in a common process system without the need of altering any part thereof for the production of a particular sulfenamide.

OBJECTS

It is an object of this invention to teach a process from which the morpholinobenzothiazole sulfenamide, N-tertbutylbenzothiazole sulfenamide and the N-cyclohexylbenzothiazole sulfenamide can be commonly produced.

It is a further object of this invention to be able to produce any of the sulfenamides listed at better yields and higher purity than was before possible in the prior art for any individual system.

Other objects will appear hereinafter.

INVENTION

The sulfenamides of this invention are produced through the oxidation of a reaction mixture of mercaptobenzothiazole dissolved in an amine containing water.

The amines used in the practices of this invention are cyclohexylamine, tertbutylamine and morpholine.

Mercaptobenzothiazole is added to an amine-water system. The temperature of the system should be maintained between 25 and 35° C. The mercaptobenzothiazole may be added in the presence of stirring to aid its solubilization in the amine. After the mercaptobenzothiazole has been dissolved in the amine, the oxidizing agent is fed to the system. The reaction mixture temperature should be held to 0–50° C. until oxidation is complete and the desired product has been formed. A preferred temperature range is 25–40° C.

The oxidation reactions involved are all exothermic. As a consequence, maintenance of the 0–50° C. temperature range may be difficult if not impossible through the sole use of external cooling. The reaction exotherm can be more carefully controlled if the oxidizing agent is fed in a continuous manner to the reaction system at a rate sufficient to maintain the reaction temperature within 30–40° C. Continuous feeding for the purposes of this invention will be defined as either "constant feeding" or "intermittent feeding." For the purposes of this invention, the total oxidizing agent should be added at such a rate so that the desired process temperature is maintained. Generally, such an addition will take longer than ten minutes.

The oxidizing agents which may be used are selected from the group consisting of chlorine, bromine, iodine and alkali metal hypochlorites, particularly sodium hypochlorite.

After the oxidation reaction has been completed, the reaction mixture is cooled from 30–35° C. to 15–20° C. This cooling results in the complete precipitation of the sulfenamide product.

Water may be added to allow for convenient filtration. No isolation of unreacted mercaptobenzothiazole is required by this method. The excess amine can be recovered. This is conveniently done by adding caustic to neutralize the amine hydrochloride which is formed during the reaction. Subsequent to such an addition, the neutralized mixture may be distilled and the amine recovered.

The sulfenamide derivatives of this invention are produced in 95%+ yield and at almost 100% purity. As a consequence, there is no need for purification of these products before their intended use. Because of the high yield and high purity the products produced by the process of this invention are directly and readily adaptable for use as accelerators in rubber vulcanization processes.

It has been discovered that a large excess of amine is necessary to prevent the formation of a disulfide.

The mole ratio of amine to mercaptobenzothiazole must be at least 8:1 and preferably 10:1.

Attempts were made to use less than an 8:1 molar excess of amine in the preparation of the sulfenamide derivatives. However, two factors mitigated against such a procedure. In the case of tertbutylbenzothiazole sulfenamide, the mercaptan amine salt was not soluble at less than a 10 molar excess of amine. The morpholine and the cyclohexylbenzothiazole mercaptan amine salts even though soluble in less than a 10 molar excess of amine yielded solutions so viscous that subsequent chlorination resulted in unworkable mixtures.

Another very critical consideration in performing the process taught by this invention is providing the proper water content. Although water is necessary as a solvent to provide workability of the reaction mixtures a minimum amount should be used to prevent hydrolysis of the sulfenyl chloride.

The water content of the system should be such that the total water on a weight basis is 8–20% as based on the reaction mixture and the oxidizing agent and the particular sulfenamide being produced.

It has been discovered that there exists an optimum range wherein water content will effect the reaction so as to produce sulfenamides with maximum yields of 95%+ and 99%+ purities.

The total water content based on the total combined weight of the reaction mixture and the oxidizing agent is as follows:

(A) 8–12% and preferably 10% for the preparation of the N-cyclohexylbenzothiazole sulfenamide;
(B) 10–20% and preferably 12% for the preparation of the N-oxydiethylenebenzothiazole sulfenamide; and
(C) 10–25% and preferably 15% for the preparation of the tertbutylbenzothiazole sulfenamide.

The effect of such water concentration is dramatically shown by runs conducted in preparing N-cyclohexylbenzothiazole sulfenamide as shown in the drawing. Optimum results were obtained when the water content was 10% based on the total and combined weight of the reaction mixture and the oxidizing agent. Lower yields resulted at both the 5 and 15% levels. Results were even worse as the water concentration became higher.

Other solvent systems were investigated. The reaction of mercaptobenzothiazole with a ten-fold excess of amine and gaseous chlorine in a tetrahydrofuran medium was also attempted. This method yielded good results in preparing N-oxydiethylenebenzothiazole sulfenamide. However, attempts to prepare tertbutylbenzothiazole sulfenamide by this method gave a product contaminated with disulfide. The preparation of N-cyclohexylbenzothiazole sulfenamide resulted in a dark oil.

The substitution of tetrahydrofuran as a solvent for water in the process taught by this invention yielded good results in only one case. Two of the three derivatives taught by this invention could not be produced using tetrahydrofuran solvent. Similar results were encountered in the use of solvents other than water.

EXAMPLES

The invention will be further illustrated by the following examples. These examples, however, are in no way intended to limit the invention.

Example I

Thirty-three and six-tenths grams (0.2 mole) of mercaptobenzothiazole were dissolved in 2.0 moles of morpholine containing 25 milliliters of water. Stirring and ice water cooling were employed to keep the temperature at 30° C. Fifteen grams (0.21 mole) of chlorine were then passed into this solution at 30–35° C. over a 15-minute period. The N-morpholinobenzothiazole sulfenamide derivative precipitated upon cooling the reaction mixture to 15–20° C. One hundred milliliters of water were then added to facilitate filtration. The product was filtered, water-washed, and air-dried. The product yield was 99%; the product had a melting point of 85° C. A thin layer chromatagraphic analysis of the product showed a purity of 99%+.

Example II

Thirty-three and six-tenths grams (0.2 mole) of mercaptobenzothiazole were dissolved in 2.0 moles of cyclohexylamine containing 25 milliliters of water. Stirring and ice water cooling were employed to keep the temperature at 30° C. Fifteen grams (0.21 mole) of chlorine were then passed into this solution at 30–35° C. over a 15-minute period. The N-cyclohexylbenzothiazole sulfenamide derivative was produced. This product was precipitated upon cooling the reaction mixture to 15–20° C. One hundred milliliters of water were added to facilitate filtration. The product was filtered, water-washed and air-dried. The product yield was 95%. A thin layer chromatographic analysis of the product showed a purity of 99%+.

Example III

Thirty-three and six-tenths grams (0.2 mole) of mercaptobenzothiazole were dissolved in 2.0 moles of tertbutylamine containing 25 milliliters of water. Stirring and ice water cooling were used to keep the temperature at 30° C. Fifteen grams (0.21 mole) of chlorine were then passed into this solution at 30–35° C. over a 15-minute period. The tertbutylbenzothiazole sulfenamide derivative was produced. The derivative product precipitated upon cooling the reaction mixture to 15–20° C. One hundred milliliters of water was added to the system to facilitate filtration. The product was filtered, water-washed, and air-dried. The product yield was 97%. A thin layer chromatographic analysis of the product showed a purity of 99%+.

Example IV

Thirty-three and six-tenths grams (0.2 mole) of mercaptobenzothiazole were dissolved in 174.2 grams (2.0 moles) of morpholine plus 25 milliliters of water with cooling below 35° C. Fifteen grams (0.21 mole) of chlorine was then passed into the reaction mixture at 30–35° C. over a 30-minute period. Upon cooling to 15° C. the N-morpholinobenzothiazole sulfenamide derivative precipitated. One hundred milliliters of water were added to the system to allow convenient filtration. The white solid was filtered, water-washed, and air-dried. The product yield was 50.5 grams or 99%+. A thin layer chromatographic analysis of the product showed a purity of 69%+.

Example V

Thirty-three and six-tenths grams (0.2 mole) of mercaptobenzothiazole were dissolved in 182 grams (2.5 moles) of tertbutylamine and 50 milliliters of water. A system temperature of 30° C. was maintained while this solubilization was taking place. Fifteen grams (0.21 mole) of chlorine were then passed into the reaction mixture over a 30 minute period at 30–35° C. Upon cooling to 12° C. the tertbutylbenzothiazole sulfenamide derivative precipitated. One hundred milliliters of water was added to facilitate the filtration. The solid precipitate was filtered, water-washed, and air-dried. The product yield was 46 grams or 97%. Thin layer chromatographic analysis showed a product purity of 99%+.

Example VI

Thirty-three and six-tenths grams (0.2 mole) of mercaptobenzothiazole were dissolved in 202 grams (2.0 moles) of cyclohexylamine plus 25 milliliters of water, at a temperature between 25–35° C. Fifteen grams (0.21 mole) of chlorine was then passed into the system over a 20 minute period at 30–35° C. On cooling to 20° C., the derivative precipitated out. One hundred milliliters of water was then added and the solid precipitate filtered, water-washed, and air-dried. The yield was 50 grams or 94%. Thin layer chromatographic analysis indicated a product purity of 99%+.

CONCLUSION

This invention teaches the oxidation of mercaptobenzothiazole dissolved in an amine containing water. The amine is selected from the group consisting of cyclohexylamine, tertbutylamine and morpholine. However, by redefining process variables, this invention may be applied to any of the other primary and secondary amines.

By using one basic process, it is possible to prepare the sulfenamide derivatives which were previously prepared by distinct individual processes.

In addition to the novelty of being able to produce all three derivatives from one common process, this invention offers the additional advantage of yielding products in 95%+ yields and 99%+ purities. Such yield and purities render the products produced by this invention immediately usable in whatever area they are desired without the need of subsequent purification.

Having described our invention we hereby claim:

1. A process for producing N-cyclohexylbenzothiazole sulfenamide in both high yield and purity through a generalized procedure which comprises: oxidizing a reaction mixture of mercaptobenzothiazole dissolved in cyclohexylamine containing water with an oxidizing agent selected from the group consisting of chlorine, bromine, iodine, and alkali metal hypochlorites under the following reaction conditions:

(A) reacting the mercaptobenzothiazole in an excess of cyclohexylamine such that the mole ratio of amine to mercaptobenzothiazole is at least 8:1;

(B) providing sufficient water to the reaction mixture such that the total water content based on the total combined weight of reaction mixture and the oxidizing agent is from 8 to 12%;

(C) maintaining the temperature of the reaction mixture to 25–35° C. during the addition of mercaptobenzothiazole;

(D) adding the oxidizing agent to the reaction mixture in a continuous manner so as to maintain the reaction temperature within the range of 0–50° C. until oxidation is completed and the desired product has been produced;

(E) cooling the oxidized reaction mixture to 15–20° C. whereby the sulfenamide product precipitates; and (F) recovering the sulfenamide product.

References Cited

UNITED STATES PATENTS 3,020,287   2/1962   Smith _____ 260—306.6

ALEX MAZEL, Primary Examiner

R. J. GALLAGHER, Assistant Examiner

U.S. Cl. X.R.

260—247.1

UNITED STATES PATENT OFFICE
CERTIFICATE OF CORRECTION

Patent No. 3,600,398                                Dated   Aug. 17, 1971

Inventor(s)  Jerry J. Svarz, Louis A. Goretta, Wood E. Hunter

It is certified that error appears in the above-identified patent and that said Letters Patent are hereby corrected as shown below:

Column 1, line 56, "N-tertbutylenzothiazole" should read -- N-tertbutylbenzothiazole --.

Column 4, line 34, "69% +" should read -- 99% + --.

Signed and sealed this 4th day of April 1972.

(SEAL)
Attest:

EDWARD M. FLETCHER, JR.                    ROBERT GOTTSCHALK
Attesting Officer                          Commissioner of Patents